(No Model.)

J. BRENDNER.
GARDEN TOOL.

No. 598,173. Patented Feb. 1, 1898.

Witnesses

Inventor
Joseph Brendner

UNITED STATES PATENT OFFICE.

JOSEPH BRENDNER, OF PACIFIC, MISSOURI.

GARDEN-TOOL.

SPECIFICATION forming part of Letters Patent No. 598,173, dated February 1, 1898.

Application filed June 2, 1897. Serial No. 639,098. (No model.)

*To all whom it may concern:*

Be it known that I, JOSEPH BRENDNER, residing at Pacific, in the county of Franklin and State of Missouri, have invented a new and useful Improvement in Garden-Tools, of which the following is a specification.

My invention relates to garden-tools—such as rakes, hoes, &c.—and is in the nature of a removable handle which can be applied to any number of tools, whereby but a single handle need be provided for all the tools needed in the garden.

The object of my invention is to provide a tang for all such tools and a handle formed to correspond therewith, whereby the same handle may be interchangeably used with any of the tools provided with this especially-constructed tang.

A further object of my invention is to furnish a tang for garden and analogous tools and a corresponding handle-socket capable of being attached to any and all of such tools, means being provided whereby such attaching and detaching can be accomplished instantly and the completed tool be as rigid as though the tang and socket were made in a solid piece.

My invention consists in the improved construction, arrangement, and combination of parts hereinafter fully described, and afterward specifically pointed out in the claims.

In order to enable others skilled in the art to which my invention most nearly appertains to make and use the same, I will now proceed to describe its construction and operation in connection with the accompanying drawings, forming a part of this specification, in which—

Figure 1:
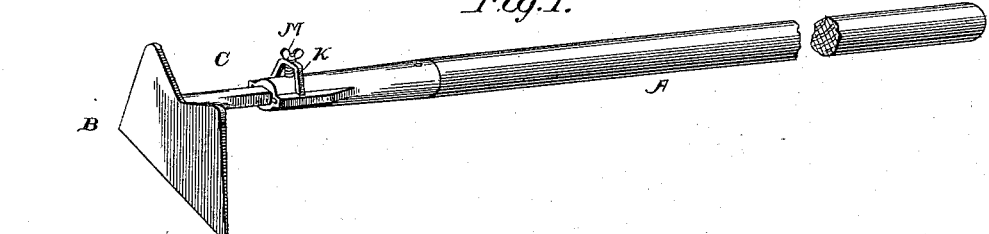
Figure 2:
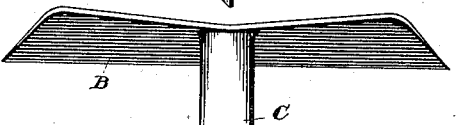
Figure 3:
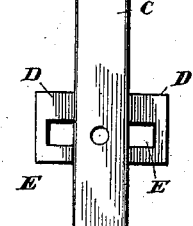
Figure 4:
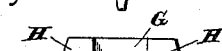
Figure 4:
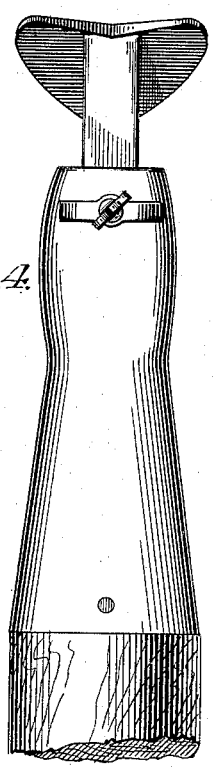
Figure 5:
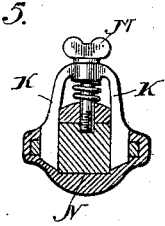
Figure 6:
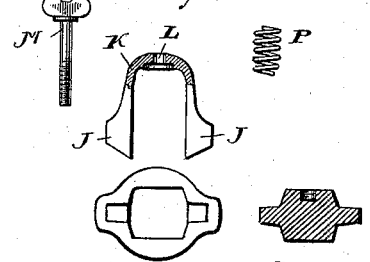

Figure 1 is a perspective view of a garden-hoe provided with my improved tang and having a handle movably secured thereto by means of my improved socket-and-clamp mechanism in position for practical operation. Fig. 2 is a longitudinal section through the handle-socket and clamp with a tang in place therein and a portion of the handle being secured in the handle-socket. Fig. 3 is a view similar to Fig. 2 with the clamp mechanism omitted and the handle and tang separated from each other, the hoe being broken away from the tang. Fig. 4 is a top plan view of my invention as applied to a different form of hoe. Fig. 5 is a section through the tang and handle-socket, showing the clamping mechanism in elevation. Fig. 6 is a detail view showing various parts of my invention detached from each other.

Referring to the drawings by letters, A is a handle for a garden tool or implement of any kind, said handle being of the usual form and material.

B represents the blade of any of the usual garden-tools, in this case a hoe, and C is the tang of the hoe, which is constructed as is usual, with the exception that it is provided on each side with a projecting flat wing D, whose outer sides are curved to correspond with the outer side of the handle-socket, as hereinafter described, each of said wings being provided with a rectangular opening E, as shown clearly in the drawings.

F is my handle-socket, provided with a central opening G of a suitable size to correspond with the main body of the tang C. On each side of this central socket extend wings corresponding in width with the wings of the tang and slotted or perforated to receive the wings E of the tang when the tang is placed in the socket G in these bifurcated wings. Passing through both forks of the same and in position to register with the openings E in the wings D of the tang C are similarly shaped and sized openings I I.

J J are two keys of the proper shape and size to pass into and closely fit the openings I I of the handle-socket and D D of the tang when the tang is placed in the handle-socket. These keys are secured together at the proper distance apart to fit into these openings by means of a bow or arch K, provided with a hole or perforation L in its apex, through which is passed a thumb-screw M, which is threaded into a hole N in the tang C, passing through the opening in the side of the handle-socket on its way to engage in said threaded hole. A spring P is coiled around the thumb-screw and raised at one end on the outside of the handle-socket and the other end bearing against the under side of the arch K, the tendency of the spring being to force the arch, and with it the case J J, outward to disengage said keys from the openings I I of the handle-socket and E E of the tang when the thumb-screw is released from engagement with the threaded opening in the tang.

All the tools for use in the garden and field can be provided with tangs, as described, while but a single handle provided with my improved handle-socket need be used, and when it is desired to attach one of these tools to the handle its tang C is placed in the central socket G of the handle-socket and pressed forward, with the wings D D between the perforated wings of the handle-socket, until the openings E E of the wings D D register with each other. The operator can now place the thumb-screw through the opening L in the arch or bow K, slip the spring P upon the thumb-screw, place the keys J J in the openings I I of the handle-socket, when by pressing inward on the thumb-screw these keys will be forced in sufficiently far for the end of the thumb-screw to engage in the threaded open end of the tang C, and by turning in the thumb-screw the keys will be pressed firmly and tightly into their seats, causing the handle and tool to be rigidly secured together.

When it is desired to remove the tool from the handle and to place another therein, it is simply necessary to turn the thumb-screw until the thread is released from the threaded opening N in the tang C, when the spring P, exerting its force under the arch K, will press the arch, with its attached keys and the thumb-screw, upward, releasing the keys from their seats in the openings I I and E E, leaving the tang free to be withdrawn from the handle-socket.

The advantages of my invention will be obvious from the foregoing description. But a single handle is required for each kit of tools, this decreasing the expense of such a kit and its bulk, rendering it easier to transport such a kit of tools from place to place, the different tools being easily attached to or detached from the handle when desired.

While I have illustrated and described the best means now known to me for carrying out my invention, I wish it to be understood that I do not restrict myself to the exact details of construction shown, but hold that any slight changes or variations as would suggest themselves to the ordinary mechanic would clearly fall within the limit and scope of my invention.

Having thus fully described my invention, what I claim as new, and desire to secure by Letters Patent of the United States, is—

1. The combination with a handle-socket provided with bifurcated wings having openings at right angles therethrough, of a tang adapted to fit said socket and having wings to correspond in size and position therewith, with corresponding transverse openings, and two keys of a proper size and shape connected together at the proper distance apart to engage in the openings of the handle-socket and tang, substantially as set forth.

2. The combination with a handle-socket provided with bifurcated wings, having openings at right angles therethrough, of a tang adapted to fit said socket and having wings to correspond in size and position therewith, with corresponding transverse openings, two keys of a proper size and shape connected together at the proper distance apart to engage in the openings of the handle-socket and tang, a thumb-screw passing through the opening in the connection between the two keys and engaging the threaded opening in the tang, and a spring around said thumb-screw and having a bearing on the outside of the handle-socket and inside of the key connection, substantially as described.

JOSEPH BRENDNER.

Witnesses:
J. W. LARISON,
EMERY C. BURKE.